B. F. FORSYTH.
CORN POPPER.
APPLICATION FILED MAY 13, 1913.
1,102,031.
Patented June 30, 1914.
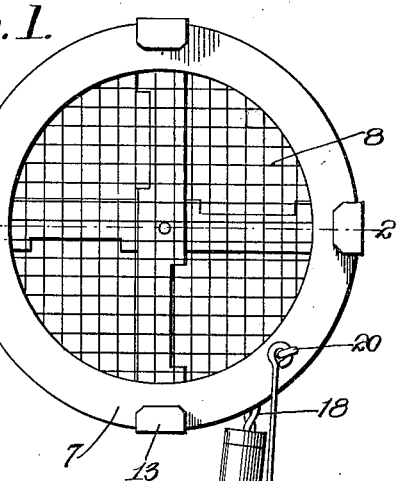
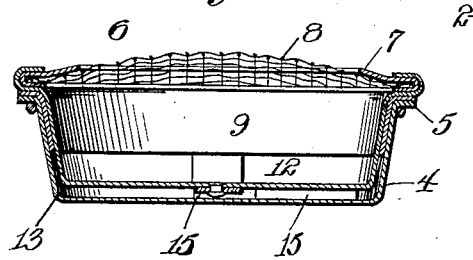
Witnesses
Wm H. Mulligan
Everett Lancaster
Inventor
Benjamin F. Forsyth,
By Richard B. Owen
his Attorney
COLUMBIA PLANOGRAPH CO., WASHINGTON, D. C.

UNITED STATES PATENT OFFICE.

BENJAMIN F. FORSYTH, OF DELTA, COLORADO.

CORN-POPPER.

1,102,031. Specification of Letters Patent. Patented June 30, 1914.

Application filed May 13, 1913. Serial No. 767,368.

*To all whom it may concern:*

Be it known that I, BENJAMIN F. FORSYTH, citizen of the United States, residing at Delta, in the county of Delta and State of Colorado, have invented certain new and useful Improvements in Corn-Poppers, of which the following is a specification.

My present invention relates to corn poppers, and more particularly to that class adapted for domestic use.

The principal object of my invention is to provide a corn popper embodying a receptacle and other co-acting elements so arranged that it will not be necessary to actuate or agitate the receptacle in order to prevent scorching or burning of the corn during popping.

Another object of my invention is to provide a popper of such shape that it may conveniently close the aperture in a stove, provided by removing the lid thereof, so that excessive heat is not emitted during use of the device.

Another object of my invention is to provide a popper which is simple in construction, and hence, inexpensive to manufacture.

Other objects of my invention will appear in the following detailed description taken in connection with the accompanying drawings forming a part of this specification, and in which drawing:—

Figure 1 is a top plan view of a popper constructed according to my invention. Fig. 2 is a cross sectional view on the line 2—2 of Fig. 1. Fig. 3 is a bottom plan view of the lid of the device and showing agitators carried thereby.

In the drawing, where similar characters refer to similar parts, 4 designates a suitable receptacle, preferably circular in plan, and may be provided with an out-turned flange 5. A lid, designated generally by 6 is oscillatable upon the receptacle and is preferably constructed of an annulus 7; reticulate means 8 carried by said annulus; and, an annular flange 9, of angular section, one section 10 of which is adapted to telescope with the receptacle at the interior thereof. The other section 11 of the annular flange is adapted to bear upon the upper portion of the receptacle, and more particularly upon the outstanding flange 5 as disclosed in the drawing.

The lid 6 carries an agitator, designated generally by 12, this agitator being preferably constructed of U-shaped members 13, the bases of which are elongated and flat, and lie closely adjacent the bottom of the receptacle 4. The arms of the members 13 extend upwardly, closely adjacent the sides of the receptacle, and extend between the annular flange 9 and annulus 7. The upper portions of the said arms are bent over the annulus 7 in order to hold the several parts rigid one with another, rivets 14 serving as suitable means for connecting the said arms with the annular flange 9.

As clearly shown in Fig. 3 of the drawing, the members 13 have downwardly turned marginal portions 15 which lie in such proximity to the bottom of the pan as to successfully dislodge any corn which might adhere thereto because of the intensity of the heat to which the receptacle is subjected. If desired, a rivet 16 may serve as suitable means for retaining the base portions of members 15 rigidly one with another and thus the one serves as reinforcement to the other to prevent flexing of such base portions should the agitator encounter corn which is very tenacious. A suitable handle 17 is provided for supporting the receptacle, the handle being operatively connected with the receptacle as by means of wire 18 embracing the receptacle in under flange 5 and twisted to extend longitudinally into the handle. It is to be noted that the handle is disposed with its axis at an angle to the axis of the receptacle, for a purpose to be subsequently set forth. In order to oscillate the lid 6, a link 19 is operatively connected with the same as by eye 20, and this link may be actuated by a reciprocable member 21 guided by the handle 17. The member 21 is suitably formed of a continuous piece of wire formed with an eye 22 to receive a similar portion of the link 19; ring shaped portions 23 embracing the handle 17, and a finger hold 24. By reciprocating the member 21 longitudinally of the handle 17, the link 19 is moved to and fro, or in other words, is oscillated about eye 22 and reciprocated. This action oscillates the lid 6, and consequently, the agitator 12 is simultaneously actuated. By disposing the handle 17 at the angle mentioned with respect to the axis of the receptacle, the amplitude of oscillation of link 19 is wholly at one side of the axis of the handle and consequently there is no dead center at which the link may come to rest.

In operation, the lid 6 is merely raised from receptacle 4 and may be wholly removed from proximity to said receptacle because of the link connection 19. The agitator is also carried with the cover and hence, the receptacle is free to receive the grains of corn. Upon replacing the lid and subjecting the grains to heat, their movement in expanding is retarded by the reticulate means 8, although, their action may be observed through such means. In order to prevent burning or scorching of the corn, the member 21 is reciprocated and this effectively agitates the material within the receptacle so that the action is uniform throughout the operation of the device.

Changes in details may be made without departing from the spirit or scope of my invention; but,

I claim:—

1. A corn popper comprising in combination, a receptacle, an annulus, reticulate means carried by said annulus to confine material within said receptacle, an annular flange of angular cross section, with one section bearing upon said receptacle and the other section telescoping with said receptacle at the interior thereof, an agitator having arms extending intermediate said annular flange and said annulus, and turned over the top of the latter, and means for securing said annular flange, the arms of said agitator and said annulus rigid with one another, substantially as and for the purpose set forth.

2. A corn popper comprising a receptacle, an annulus, reticulate means carried by said annulus to confine material within said receptacle, an annular flange of angular cross section with one section bearing upon said receptacle and the other section telescoping with the said receptacle at the interior thereof, an agitator having arms extending in close proximity to the sides of said receptacle, intermediate said annular flange and said annulus, and turned over the top of the latter, and means for securing said annular flange, the arms of said agitator and said annulus rigid one with another, substantially as and for the purpose set forth.

3. A corn popper comprising a receptacle, a cover, an agitator provided with arms having their outer end portions bent to engage said cover, and an annular flange engaging said agitator and fitting within said receptacle and having its outer edge portion bent to extend over the edge of said receptacle between said receptacle and the arms of said agitator.

In testimony whereof I affix my signature in presence of two witnesses.

BENJAMIN F. FORSYTH.

Witnesses:
J. T. HAMMOND,
J. T. HAMMOND, Jr.

Copies of this patent may be obtained for five cents each, by addressing the "Commissioner of Patents, Washington, D. C."